(12) United States Patent  (10) Patent No.: US 9,102,113 B2
Wright et al.  (45) Date of Patent: Aug. 11, 2015

(54) BAND DRUM POP-UP HINGE

(75) Inventors: Chad Wright, McMinnville, TN (US); Daryl Malone, Manchester, TN (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 174 days.

(21) Appl. No.: 13/285,015

(22) Filed: Oct. 31, 2011

(65) Prior Publication Data

US 2013/0105068 A1   May 2, 2013

(51) Int. Cl.
*B29D 30/24* (2006.01)
*B29D 30/42* (2006.01)

(52) U.S. Cl.
CPC ........ B29D 30/244 (2013.01); *B29D 2030/427* (2013.01)

(58) Field of Classification Search
CPC ............... B29D 30/12; B29D 30/1607; B29D 30/3007; B29D 30/244–30/248; B29D 2030/2657; B29D 2030/2671; B29D 2030/2678; B29D 2030/2685; B29D 2030/2692; B29D 2030/421–2030/423; B29D 2030/427; B29D 2030/428
USPC ....................... 156/134, 414–420; 249/67, 68; 425/438, 442, 444
See application file for complete search history.

(56) References Cited

U.S. PATENT DOCUMENTS

| 4,093,495 A | 6/1978 | Colombani |
| 4,604,158 A * | 8/1986 | Broyles .......................... 156/403 |
| 5,073,226 A * | 12/1991 | Suzuki et al. ................. 156/417 |
| 5,116,449 A | 5/1992 | Fabris et al. |
| 5,120,390 A * | 6/1992 | Klose et al. ................... 156/401 |
| 5,266,147 A | 11/1993 | Lundeen |
| 6,205,924 B1 | 3/2001 | Kamano |
| 6,250,356 B1 * | 6/2001 | Cordaillat et al. ............. 156/400 |
| 6,673,183 B2 | 1/2004 | Byerley |
| 6,723,195 B1 * | 4/2004 | Felten ............................ 156/133 |
| 6,986,241 B2 | 1/2006 | Beck |
| 2002/0096263 A1 * | 7/2002 | Cordaillat et al. ............. 156/402 |
| 2006/0272780 A1 * | 12/2006 | Takagi ............................ 156/502 |
| 2007/0246164 A1 * | 10/2007 | de Laubier et al. ............ 156/417 |

FOREIGN PATENT DOCUMENTS

SU          1777584 A3 * 11/1992

* cited by examiner

*Primary Examiner* — Geoffrey L Knable (57) ABSTRACT

A tire building apparatus includes a tire building drum having a radially expanded position for building a tire carcass, and having a radially contracted position for releasing the tire carcass. A carcass release member is mounted on the drum such that the carcass release member moves from a retracted position when the drum is in its expanded position, to an extended position when the drum is in its contracted position, so that the carcass release member aids in releasing the tire carcass from the drum when the drum moves from its expanded position to its contracted position.

17 Claims, 7 Drawing Sheets

BAND DRUM POP-UP HINGE

BACKGROUND OF THE INVENTION

1. Field of the Invention

The present invention relates generally to apparatus for building tires, and more particularly, but not by way of limitation, to apparatus and methods for aiding in the removal of a tire carcass from a tire building drum.

2. Description of the Prior Art

It is known to build a carcass for a tire on a rotatable drum often referred to as a band drum. The carcass which is built on the band drum may be transferred next to a B.O. ring which removes the carcass from the band drum and transports the carcass to the next operation.

During the removal of the carcass from the band drum and its transfer to the B.O. ring, it sometimes happens that the carcass sticks to the band drum and is damaged, resulting in scrapping of the damaged carcass.

Previously this problem has been addressed by coating the band drum with a non-stick release coating allowing the rubber of the carcass to release from the band drum when the band drum collapses. Such release coatings are expensive, and often wear away in a relatively short time, sometimes less than two months. Release coatings are not always effective and damage to tire carcasses due to sticking to the band drum is still a problem.

Accordingly, there is a continuing need for improved apparatus and methods for releasing a tire carcass from a band drum.

SUMMARY OF THE INVENTION

In one aspect, a tire building apparatus includes a tire building drum having a radially expanded position for building a tire carcass, and having a radially contracted position for releasing the tire carcass. A carcass release member is mounted on the drum such that the carcass release member moves from a retracted position when the drum is in its expanded position, to an extended position when the drum is in its contracted position, so that the carcass release member aids in releasing the tire carcass from the drum when the drum moves from its expanded position to its contracted position.

In another aspect, a method of manufacturing a tire carcass includes steps of:

(a) placing an inner layer of a tire carcass about a band drum when the band drum is in a radially expanded position, the band drum including at least one carcass release member retracted into an outer surface of the band drum when the band drum is in its expanded position;

(b) radially contracting the band drum to release the tire carcass from the band drum; and (c) during step (b), moving the carcass release member outward relative to the outer surface of the band drum to aid in removing the tire carcass from the band drum.

Numerous objects features and advantages of the present invention will be readily apparent to those skilled in the art upon a reading of the following disclosure when taken in conjunction with the accompanying drawings.

DETAILED DESCRIPTION

Figure 1:
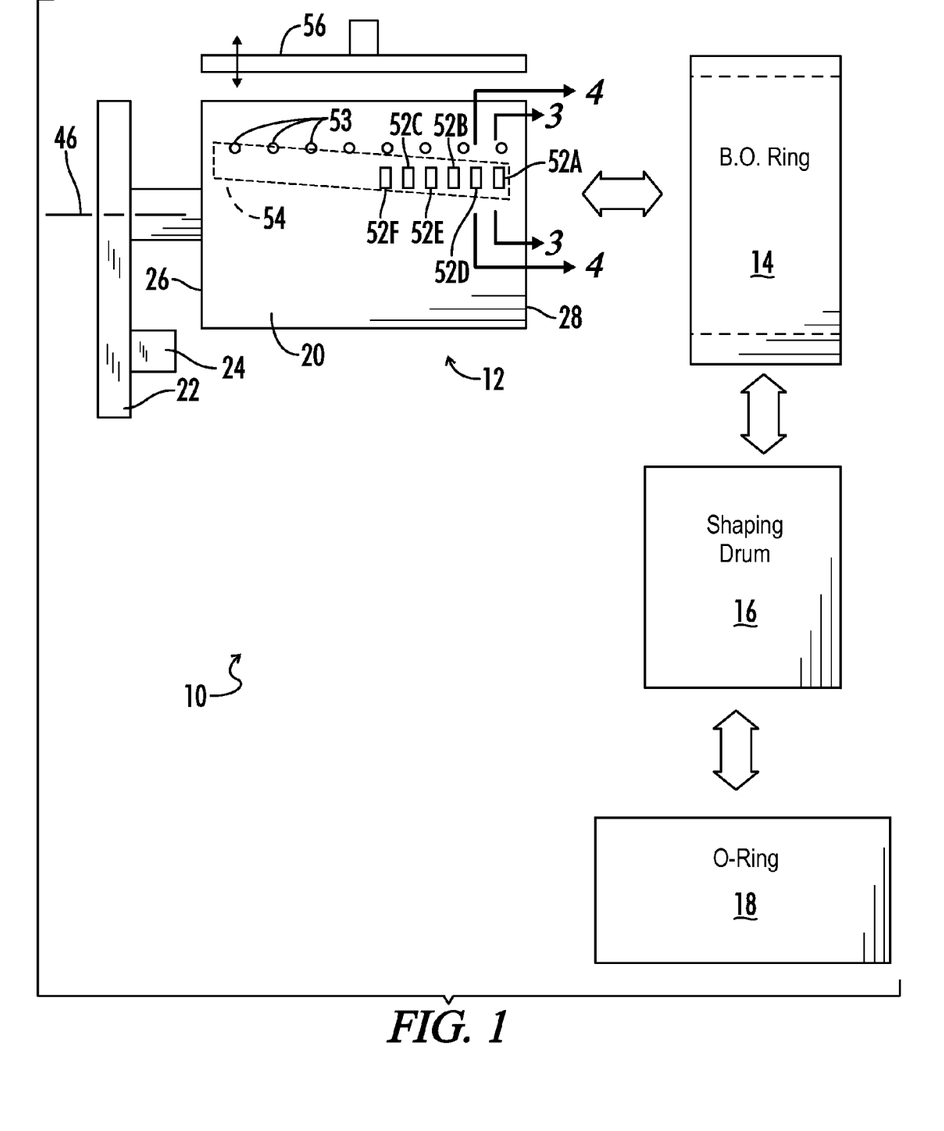
FIG. 1 is a schematic plan view of a semi-automated tire building process including a band drum, a B.O. ring, a shaping drum, and an O ring.

FIG. 1 is a schematic plan view of a semi-automated tire assembly station or machine generally designated by the numeral 10. The tire assembly machine 10 includes a band drum building machine generally designated by the numeral 12, a B.O. ring generally designated by the numeral 14, a shaping drum generally designated by the numeral 16, and an O ring generally designated by the numeral 18. A tire assembly machine like the machine 10 is particularly suited to the building of relatively large tires such as truck tires for use on semi trailer trucks and the like.

In the tire building process, a tire carcass is first constructed on the band drum 12 as a cylindrical member made from a series of laid up layers of rubber and fabric components.

After construction of the tire carcass, the band drum 12 moves axially into the interior of the B.O. ring 14, and then the band drum radially contracts as the apparatus of the B.O. ring 14 grasps the tire carcass with a plurality of vacuum members, to remove the tire carcass from the band drum 12. The B.O. ring 14, then transfers the still unshaped tire carcass onto the shaping drum 16.

The O ring 18 then transfers a belt and tread package onto the shaping drum 16 around the tire carcass. Then the shaping drum 16 shapes the tire carcass and the belt and tread package and joins the same together to form a green tire.

The green tire is then removed from the shaping drum 16 by the O ring 18 which transfers the green tire to the next processing station.

The band drum tire building machine 12 includes a generally cylindrical tire building drum 20 mounted in a cantilever fashion from a drum drive 22 so that the drum 20 can be rotated in a precise controlled indexed fashion to coordinate the movements of the band drum with the application of incoming layers of various rubber components which are being fed to the band drum tire building machine 12 by assorted conveyor systems. A control system 24 is associated with the drum drive 22, and a human operator who is monitoring the operations at the various machines of the tire building station 10 can direct the movements of the drum 20 via inputs to the control system 24.

The drum 20 can be described as having an inboard end 26 closest to the drum drive 22, and an outboard end 28 furthest from the drum drive 22. The outboard end 28 is a free cantilevered end which allows removal of the finished tire carcass axially outward over the outboard end 28.

Figure 2:
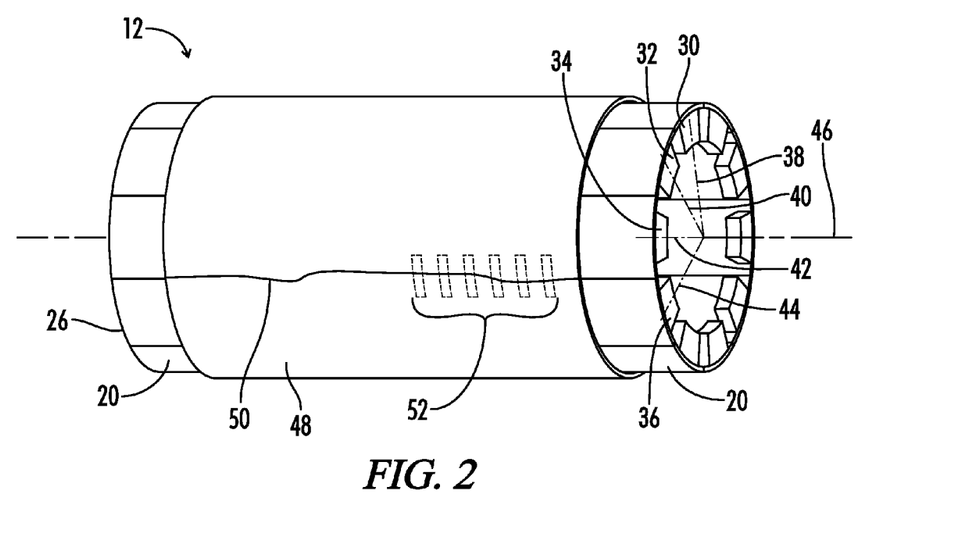
FIG. 2 is a schematic perspective view of the band drum of FIG. 1 illustrating the location of an inner layer splice with reference to the carcass release members or extendible pop-up fingers of the band drum.
Figure 3:
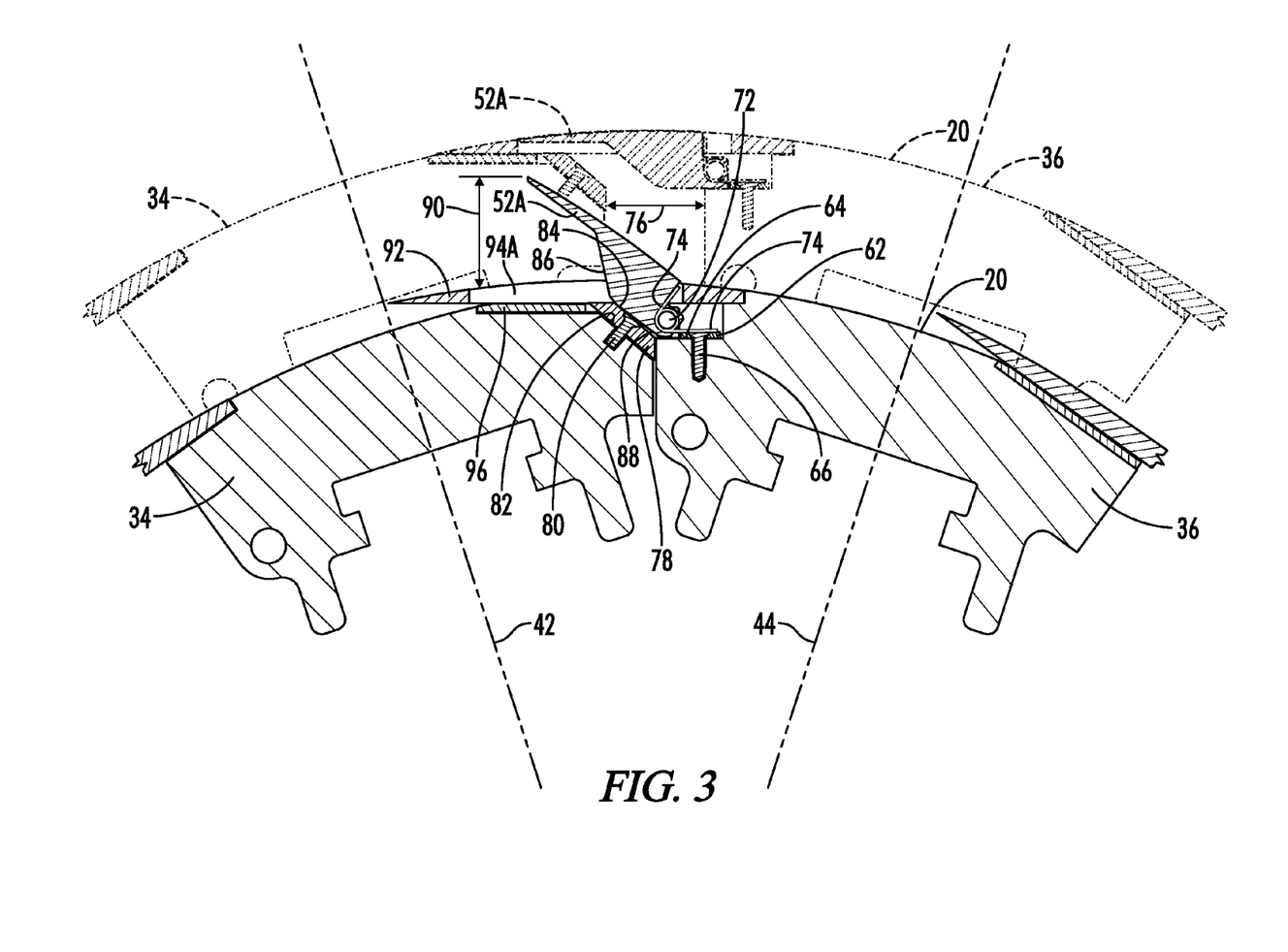
FIG. 3 is a cross-section view of a portion of the band drum taken along line 3-3 of FIG. 1, showing the mounting of a first row of extendible pop-up fingers. In the lower solid line portion of FIG. 3 the band drum is shown in its contracted position, and in the upper dashed line portion of FIG. 3 the band drum is shown in its radially expanded position.
Figure 4:
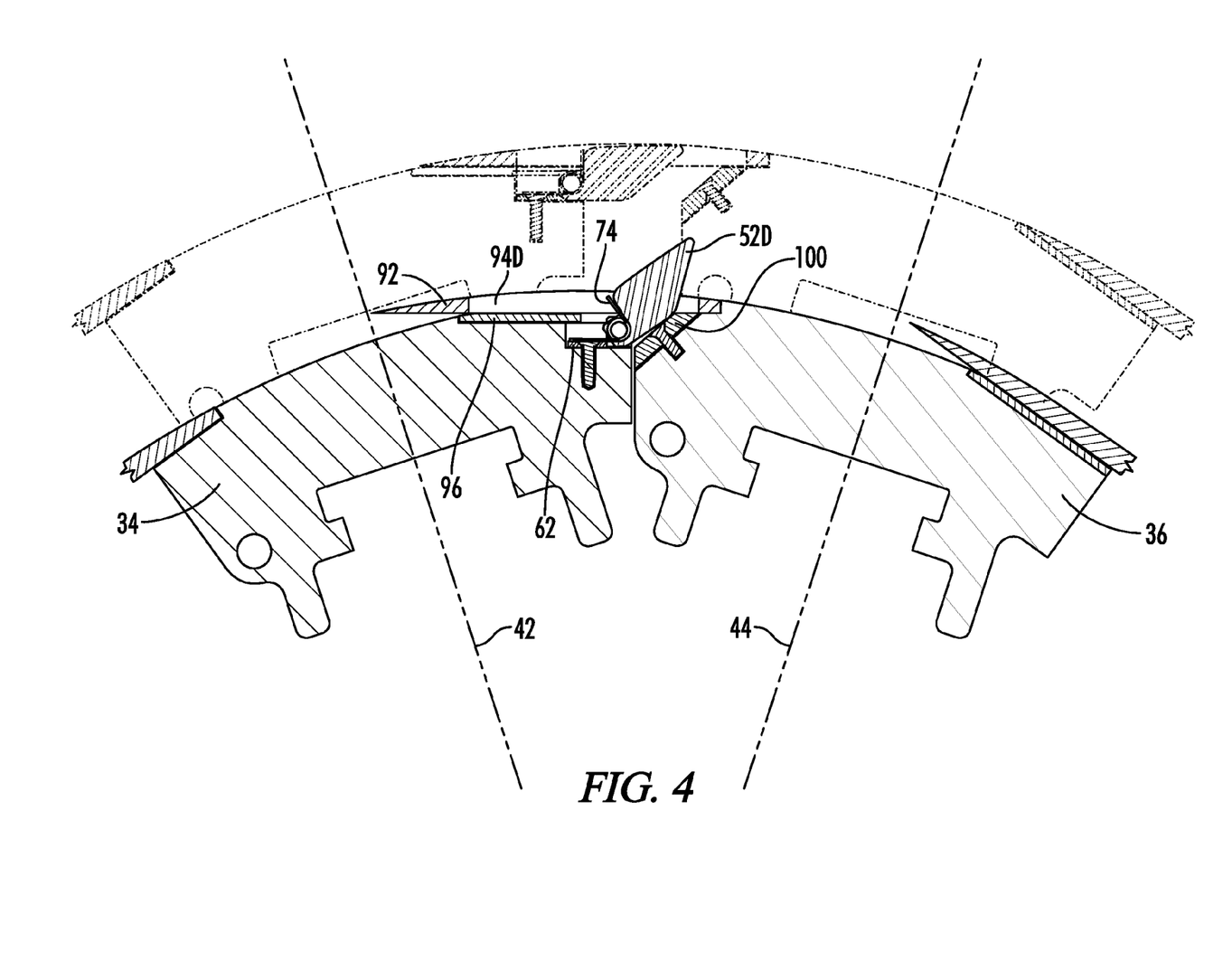
FIG. 4 is a cross-section view of a portion of the band drum taken along line 4-4 of FIG. 1, showing the mounting of a second row of extendible pop-up fingers. In the lower solid line portion of FIG. 4 the band drum is shown in its contracted position, and in the upper dashed line portion of FIG. 4 the band drum is shown in its radially expanded position.

As is best understood with regard to FIGS. 2-4, the drum 20 is made up of a plurality of generally arcuate shaped drum segments a few of which are identified in FIG. 2 as 30, 32, 34 and 36. Each of the drum segments is movable radially inward and outward along radial axes such as 38, 40, 42 and 44. The arcuate drum segments are movable radially inward and outward along their noted axes relative to a rotational axis 46 of the drum 20 between a radially outer position as shown in dashed lines in FIGS. 3 and 4, and a radially inner position as shown in solid lines in FIGS. 3 and 4.

When the drum 20 is located in its tire building position as shown in FIG. 1, it is in its expanded position as schematically illustrated in FIG. 2. With the drum 20 in its expanded position, the various layers of rubber and fabric materials are laid up on the drum to build the tire carcass. For example, in FIG. 2, an inner layer 48 is shown wrapped about the drum 20 so that the two ends of the inner layer 48 meet at a splice 50. In one example the inner layer 48 may be a sidewall and inner liner package made up of multiple components that are applied and wrapped about the drum 20 simultaneously. It will be understood that depending upon the tire design the inner layer 48 may be any desired inner component of the tire carcass.

In the example shown in FIG. 2, the splice 50 forms an irregular line which lies at a shallow angle to the rotational axis 46 of the drum 20. The inner layer 48 is placed about the drum 20 with the drum 20 in its radially expanded position, and the drum 20 is rotated through approximately 360°, so as to bring the two free ends of the sheet of material which comprises the inner layer 48 together near the location of the splice 50. The human operator may then manually assist in the careful placement of the two free ends of the inner layer 48 together to form the splice 50 therebetween due to the tacky nature of the rubber material forming the inner layer 48. It will be understood that the free ends of inner layer 48 at the splice 50 may be butted together, or they may be beveled so as to overlap.

It is noted that as shown in FIG. 2, the splice 50 preferably at least partially overlies the location of a carcass release member comprising a plurality of extendible fingers 52 shown in dashed lines in FIG. 2.

As noted, the movements of the band drum 20 are carefully and precisely controlled by a control system 24. The control system 24 is configured to rotate the drum 20 approximately 360° between defined starting and stopping positions during the application of the inner layer 48 of a tire carcass to the drum 20. This insures that the splice 50 is always located in approximately the same location on the drum 20, which location may be described as a splice zone 54 defined on the outer surface of the drum 20, which splice zone 54 is schematically illustrated by the dashed line area shown in FIG. 1.

The band drum tire building machine 12 further includes the plurality of extendible fingers 52 mounted on the drum 20 such that the fingers 52 move from a retracted position when the drum is in its expanded position, to an extended position when the drum is in its contracted position. Thus as will be further described below, the extendible fingers 52 will aid in releasing the tire carcass, including the inner layer 48, from the drum 20 when the drum 20 moves from its expanded position to its contracted position so as to transfer the tire carcass to the B.O. ring 14.

Figure 5:
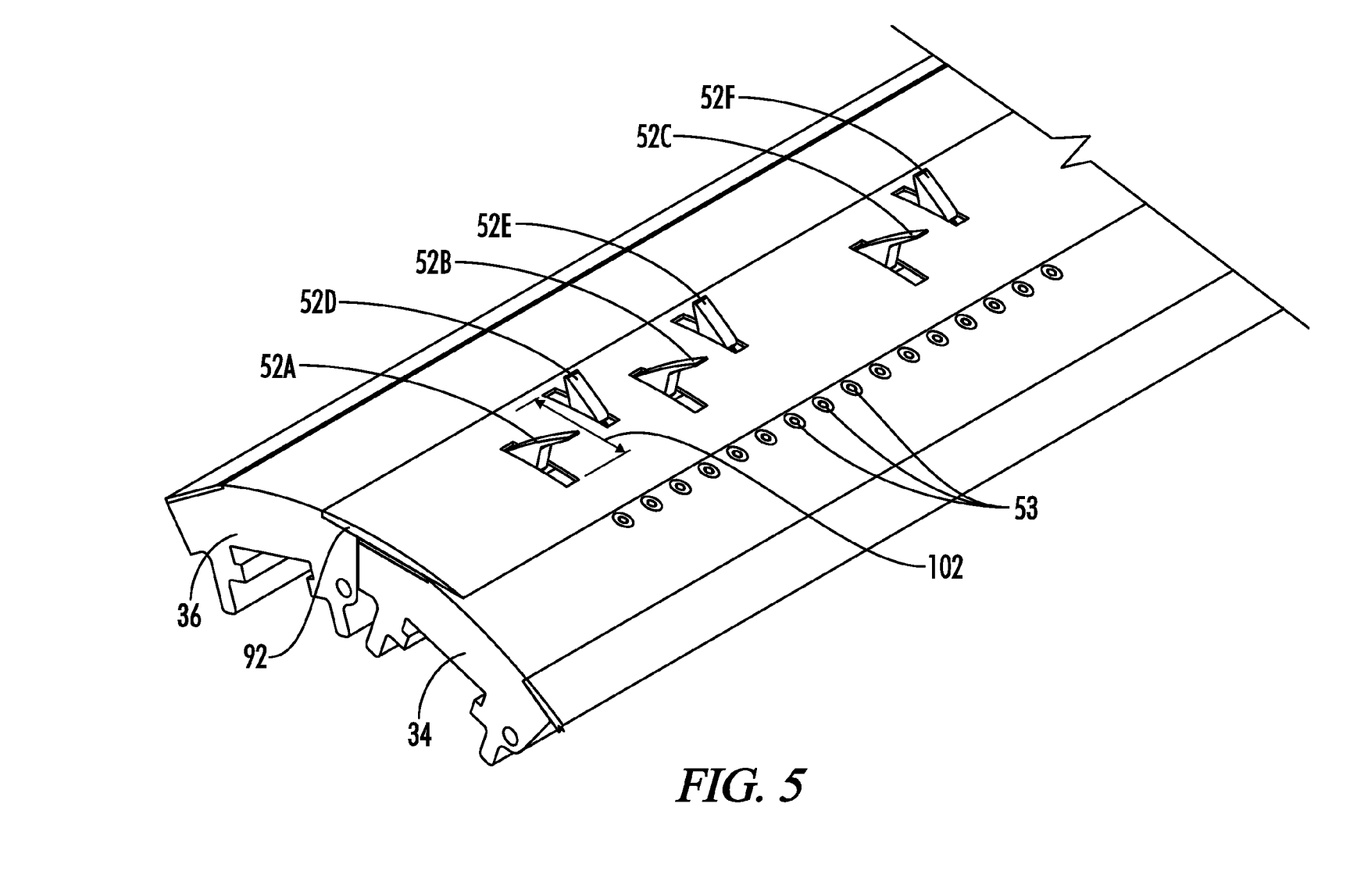
FIG. 5 is a perspective view from the outboard end of the band drum in its contracted position with the two rows of extendible pop-up fingers projecting radially outward beyond the outer surface of the drum.

As seen in FIGS. 1 and 5, certain ones of the drum segments such as drum segment 34 may have located therein a row of air jets such as 53. The air jets 53 are utilized to eject an air stream during the contraction of the band drum 20 to further aid in the release of the tire carcass from the band drum.

As is seen in FIGS. 1 and 2 schematically, the plurality of extendible fingers 52 at least partially underline the splice zone 54 and the splice 50 of the inner layer 48.

After the inner layer is in place on the drum 20, various other layers of rubber and/or fabric materials will be applied. At one stage in that process, the splice 50 will be located adjacent a row of jam pads 56 located near the back side of the drum 20. With the drum 20 stopped, the jam pads 56 move radially inward into engagement with the inner layer on top of the splice 50 so as to aid in smoothing and securing the splice 50 between the free ends of the inner layer 48. One result of this action of the jam pads is that the inner layer 48 will tend to stick to the outer surface of the drum 20 in the splice zone around splice 50, and thus the plurality of extendible pop-up fingers 52 will aid in breaking the inner layer 48 away from the drum 20 in the area of the splice 50 which has been jammed against the drum 20 by the jam pads 56.

As is best seen in FIG. 5, the plurality of extendible fingers 52 are arranged in a first row of longer fingers 52A, 52B and 52C which extend in a clockwise direction when viewed from the outboard end 28 of drum 20, and a second row of shorter fingers 52D, 52E and 52F which extend in a counterclockwise direction when viewed from the outboard end 28 of drum 20. Thus the plurality of extendible fingers 52 can be described as being arranged in first and second rows of alternating fingers, with the fingers 52A, 52B and 52C of the first row pointing in a circumferential direction opposite to the fingers 52D, 52E and 52F of the second row.

Referring now to FIGS. 3 and 4, it is seen that the fingers 52A, 52B and 52C are pivotally connected or hinged to drum segment 36, and extendible fingers 52D, 52E and 52F are pivotally connected or hinged to drum segment 34, which is adjacent to drum segment 36.

The details of the pivotal mounting of the fingers 52 are best understood with reference to FIGS. 3 and 4, in addition to FIGS. 6-11 which show the details of construction of each of the fingers.

Referring to FIG. 3 and FIGS. 6-9, the method of pivotal attachment of the longer fingers such as 52A will be described. The shorter fingers are attached in a similar manner.

Figure 8:
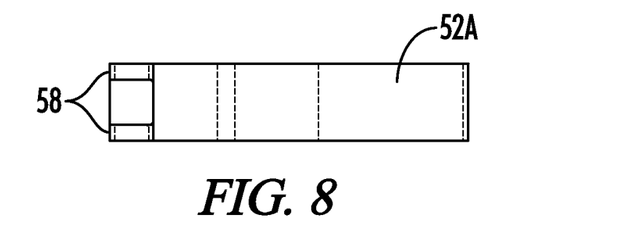
FIG. 8 is a plan view of one of the longer extendible pop-up fingers.
Figure 9:
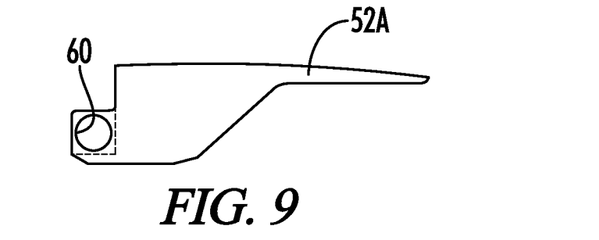
FIG. 9 is a side elevation view of the longer extendible pop-up finger of FIG. 8.
Figure 10:
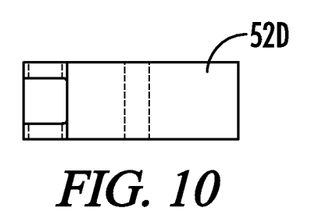
FIG. 10 is a plan view of one of the shorter extendible pop-up fingers.
Figure 11:
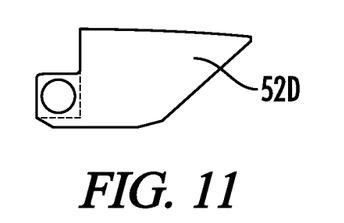
FIG. 11 is a side elevation view of the shorter extendible pop-up finger of FIG. 10.

As seen in FIGS. 8 and 9, the longer finger 52A has two mounting flanges 58 each of which has a pivot pin hole 60 defined therein.

Figure 6:
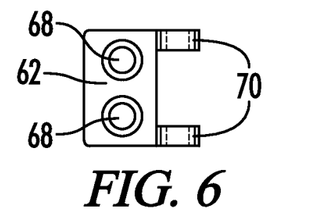
FIG. 6 is a plan view of a hinge mounting plate for mounting one of the extendible pop-up fingers.
Figure 7:
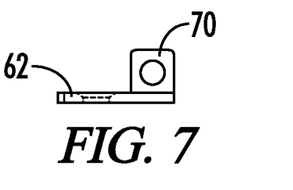
FIG. 7 is a side elevation view of the mounting plate of FIG. 6.

The pivot finger 52A is mounted upon the drum segment 36 with a mounting plate 62 seen in FIGS. 3 and 6.

A flat surface 64 is machined on the drum segment 36, and is then drilled and tapped to receive mounting screws 66 which extend through screw holes 68 in the mounting plate 62. The mounting plate 66 includes a pair of flanges 70 which are spaced apart so as to receive the mounting flanges 58 of finger 52A therebetween.

A pivot pin 72 as seen in FIG. 3 extends through the openings in the mounting flanges 58 and 70 to pivotally connect the finger 52A to the mounting plate 62. A coiled wire return spring 74 is disposed around the pivot pin 72 and engages the mounting plate 62 and the finger 52A as generally seen in FIG. 3 so that the return spring 74 will always bias the finger 52A toward its retracted position as shown in the upper portion of FIG. 3.

FIG. 3 illustrates the manner of operation of the long extendible fingers 52A, 52B and 52C as the drum segments such as 34 and 36 of drum 20 move radially inward from the radially expanded position of the drum as represented in dashed lines to the radially contracted position of the drum as represented in solid lines in FIG. 3.

Looking first at the radially expanded position of drum 20 represented in dashed lines in the upper portion of FIG. 3, it is seen that in the expanded position there is a circumferential gap 76 between drum segments 34 and 36. As the drum segments 34 and 36 move radially inward along their radial axes 42 and 44, the gap 76 closes until the segments 34 and 36 are abutted to or close to being abutted to each other as shown in solid lines in the lower portion of FIG. 3. Thus, the radially inward motion of the drum segments such as 34 and 36 results in a circumferential closing of the gap 76 thus moving the drum segments 34 and 36 toward each other.

On the drum segment 34, a hardened wear plate 78 is mounted via screws 80 on a flat 82 which has been machined on the surface of drum segment 34.

As the gap 76 closes, a tapered surface 84 of wear plate 80 engages a cam surface 86 defined on the underside of finger 52A thus causing finger 52A to begin pivoting upward. The wear plate 78 ultimately rides under a lower surface 88 of finger 52A into the position shown in the lower portion of FIG. 3 wherein the finger 52A is held in a fully extended position above the outer surface of the drum 20. In the fully extended position, the finger 52A projects a distance 90 above the outer surface of drum 20, and this projection lifts the inner cylindrical surface of the inner layer 48 off of the drum surface 20 thus aiding in breaking any adhesion of the inner layer 48 to the outer surface of drum 20 and allowing the carcass assembly including the inner layer 48 to be released from the drum 20.

Figure 12:
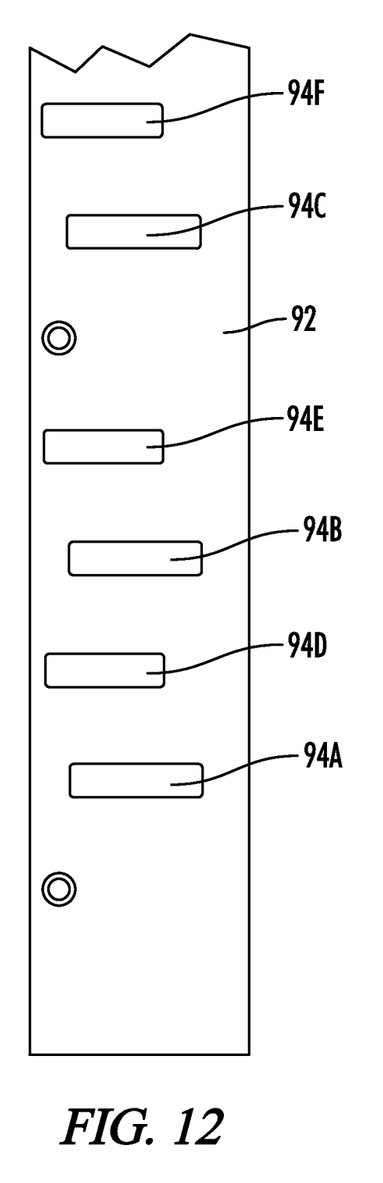
FIG. 12 is a partial plan view of a cover plate showing cut out windows through which the extendible pop-up fingers will extend.
Figure 13:
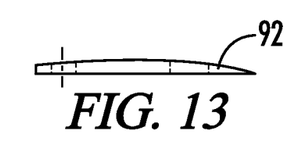
FIG. 13 is an end view of the cover plate of FIG. 12.

As is also seen in FIG. 3, a cover plate 92 is attached to one edge of each of the drum segments such as 34 and 36 and extends tangentially over the gap 76 when the drum segments are in their radially outer expanded position. The details of construction of the outboard portion of one of the cover plates 92 are shown in FIGS. 12 and 13. The cover plate 92 has a plurality of windows 94A-F cut therein through which the fingers 52A-F, respectively, protrude when in their extended positions.

Figures 14, 15:
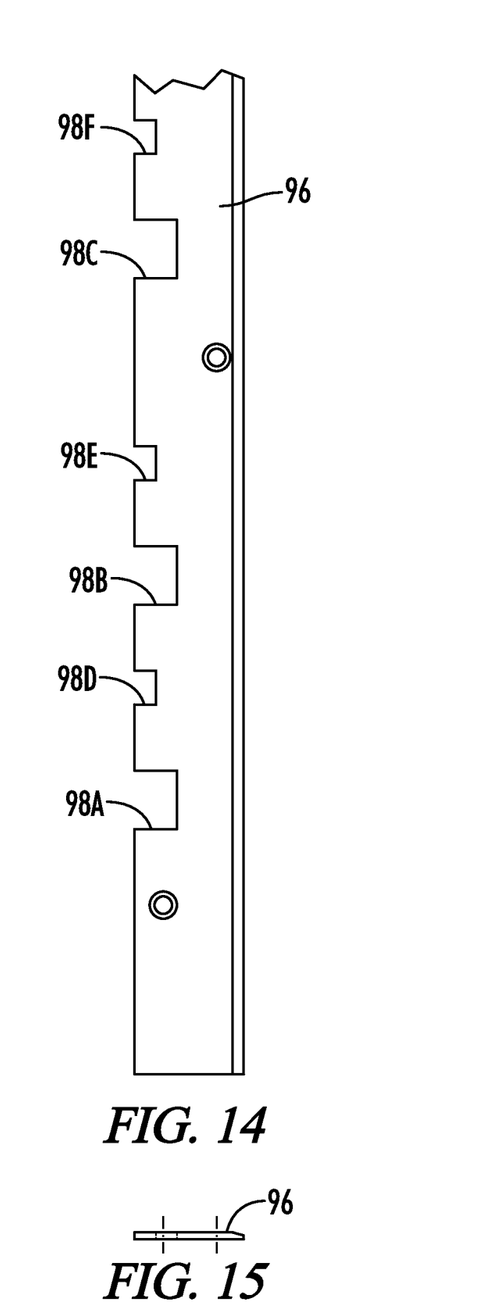
FIG. 14 is a partial plan view of a support plate, showing cut outs to provide clearance for the pop-up fingers.
FIG. 15 is an end view of the support plate of FIG. 14.

As the drum 20 moves between its expanded and contracted positions as seen in FIG. 3, the cover plate 92 slides circumferentially across a support plate 96 which is attached to the other edge of each drum segment. The details of construction of one of the support plates 96 are seen in FIGS. 14 and 15. There it is also seen that windows 98A-F are formed in the support plate 96 to underlie and correspond to the windows 94A-F of the cover plate 92.

Optionally it is noted that the outer surfaces of the fingers 52 may be coated with a release material of a type like that which has been previously used on the outer surfaces of the band drum itself.

The use of the extendible pop-up fingers disclosed herein to aid in the removal of a tire carcass from a tire carcass building machine is particularly suitable for use on relatively large tires, such as for example truck tires used on semi trailer trucks and the like. A band drum such as the band drum 20 described herein may for example be utilized to build tire carcasses for truck tires having rim diameters of 22.5 inches or 24.5 inches. In general one embodiment of the drum can be described as being configured to build a tire carcass for a truck tire having a rim diameter of at least 22.0 inches.

In one example, for a system of pop-up extendible fingers 52 such as described herein for use in building a truck tire having a rim diameter of 24.5 inches, the clearance or projection 90 of the longer extendible fingers may be approximately 1⅜ inches. Similarly on a tire building machine designed for building tires for a 22.5 inch diameter wheel rim, the projection 90 may be approximately 1.0 inch. In general the system can be described as having fingers which extend at least 1.0 inch above an outer drum surface when the drum is in its contracted position.

Referring now to FIG. 4, it is seen that the shorter fingers 52D, 52E and 52F are pivotally attached to drum segment 34 in a similar manner to that just described for the longer fingers. Also, it is seen that the shorter fingers such as 52D engage wear plates 100 mounted on the drum segment 36.

As is best seen in FIGS. 3 and 4, the design of both the long and short pop-up fingers includes a very thick section near its pivot point which provides adequate strength for the pop-up finger to resist the bending forces placed thereon when it attempts to lift the stuck tire carcass from the drum.

It is further noted as best seen in FIG. 5 and in a comparison of FIGS. 3 and 4, that when all of the fingers are in their extended positions, the outer ends of the longer fingers 52A, 52B and 52C are tangentially spaced by a distance 102 from the outer ends of the shorter fingers 52D, 52E and 52F. Thus a circumferential portion of the inner layer 48 is raised across that distance 102 and extending circumferentially beyond the distance 102 on either side of the lifting fingers. This distance 102 preferably spans across the location of the splice 50 thus ensuring that the area of the inner layer 48 adjacent the splice 50 near the outboard end of the drum is mechanically lifted off the drum 20.

The design set forth herein can either be applied to newly constructed tire building drums, or existing drums can be retrofit. In order to retrofit an existing drum, the drum segments are machined to provide the flats such as 64 and 82 for mounting of the mounting plates. The pop-up fingers are attached to the mounting plates. The wear plates are attached to the opposed drum segments. The cover plates and bearing plates are modified to provide windows therein for the pop-up fingers.

Methods of Operation

The present invention also includes methods of manufacturing a tire carcass which can generally be described as follows.

The inner layer 48 of the tire carcass is placed about the band drum 20 when the band drum 20 is in its radially expanded position. The band drum 20 includes the plurality of pop-up fingers 52 which are retracted below the outer surface of the band drum 20 when the band drum 20 is in its expanded position.

Then the band drum 20 is radially contracted to release the tire carcass including the inner layer 48 from the band drum.

During the radial contraction of the band drum, the pop-up fingers 52 are moved outward relative to the outer surface of the band drum to aid in removing the tire carcass from the band drum. During the contraction of the band drum, an underside of each of the pop-up fingers is in sliding engagement with one of the wear plates such as 78 or 100 mounted on a drum segment adjacent to a drum segment on which each of the pop-up fingers is pivotally mounted.

Preferably, when the inner layer is placed on the band drum the two free ends of the inner layer are spliced to form a splice overlying at least some of the pop-up fingers.

The splice may be compressed against the band drum by the jam pads 56, thus causing the inner layer 48 to tend to adhere to the outer surface of the band drum in the area of the splice. The location of the pop-up fingers below this area engaged by the jam pads aids in release of the inner layer in this particularly troublesome location.

As previously noted, the pop-up fingers are preferably located closer to the axially outboard end 28 of the band drum than they are to the axially inboard end 26 of the band drum.

After release of the tire carcass including the inner layer 48, the band drum 20 is returned to its radially expanded position for receiving another inner layer.

During the expansion of the band drum, the pop-up fingers 52 are biased back to their retracted positions by the springs 74.

By providing for the reliable release of the tire carcass from the tire building apparatus, via the mechanical pop-up fingers disclosed herein, numerous improvements are provided to the tire building process. It is possible to avoid the use of release coatings on the drum, which saves substantial cost for the coatings themselves. Furthermore, down time of the machines due to stuck tire carcasses is reduced. Additionally, the costs of the damaged carcasses which must be scrapped when they stick to the drum are eliminated or reduced.

While one embodiment of the carcass release member has been illustrated, other variations may be used. For example, all of the fingers could be placed in a single row rather than in two rows. Also, the pop-up fingers could all be pointed in the same direction, rather than in alternating directions. Additionally, pop-up fingers could be placed at more than one of the segment intersections so that there are multiple sets of pop-up fingers at different locations on the drum. In general, the pop-up finger arrangement shown could be applied to any location on a particular drum construction that proved to be problematic with regard to a tire carcass or other such components sticking to the drum on which the rubber components are assembled. Furthermore, instead of fingers, the carcass release member could comprise one or more axially elongated hinged plates.

ADDITIONAL DESCRIPTION

Exemplary constructions for a tire building apparatus and method have been described. The following clauses are offered as further description of the disclosed invention.

(1) A tire building apparatus, comprising:
a tire building drum having a radially expanded position for building a tire carcass, and having a radially contracted position for releasing the tire carcass; and
a carcass release member mounted on the drum such that the carcass release moves from a retracted position when the drum is in its expanded position, to an extended position extending above an outer surface of the drum when the drum is in its contracted position, so that the carcass release member aids in releasing the tire carcass from the drum when the drum moves from its expanded position to its contracted position.

(2) The apparatus of clause 1, further comprising:
a control system configured to rotate the drum between defined starting and stopping positions during application of an inner layer of a tire carcass to the drum, so that a splice zone is defined on the drum where ends of the inner layer are to meet to be spliced; and
the carcass release member at least partially underlies the splice zone.

(3) The apparatus of clause 1 or 2, further comprising:
a row of jam pads oriented to compress the inner layer against the drum.

(4) The apparatus of any preceding clause, wherein:
the drum has an inboard end and an outboard end, the outboard end being free to allow removal of the tire carcass axially outward over the outboard end; and
the carcass release member is located nearer to the outboard end than to the inboard end of the drum.

(5) The apparatus of any preceding clause, wherein:
the drum includes a plurality of arcuate drum segments movable radially relative to a rotational axis of the drum between radially outer and radially inner positions corresponding to the expanded and contracted positions, respectively, of the drum; and
the carcass release member is pivotally attached to at least one of the drum segments and engages an adjacent drum segment so as to be pivoted outward away from a drum outer surface as the drum segments move from their radially outer to their radially inner positions.

(6) The apparatus of any preceding clause, wherein:
the carcass release member comprises a plurality of extendible fingers.

(7) The apparatus of any preceding clause, wherein:
the plurality of extendible fingers are arranged in first and second rows of alternating fingers, with the fingers of the first row pointing in a circumferential direction opposite to the fingers of the second row.

(8) The apparatus of any preceding clause, wherein:
the fingers of the first row of fingers are pivotally attached to a first one of the drum segments, and the fingers of the second row of fingers are pivotally attached to an adjacent second one of the drum segments.

(9) The apparatus of any preceding clause, wherein:
the fingers of the first row of fingers are of a different length than the fingers of the second row of fingers.

(10) The apparatus of any preceding clause, wherein:
the drum further includes a plurality of cover plates, each cover plate attached to one of the drum segments and extending generally tangentially to cover a gap between adjacent drum segments when the drum is in its expanded position; and
one of the cover plates has a plurality of windows defined therethrough, and the extendible fingers retract into the windows when the drum is in its expanded position, and the extendible fingers extend out of the windows when the drum is in its contracted position.

(11) The apparatus of any preceding clause, wherein:
a plurality of wear plates mounted on the drum segments so that each extendible finger slides against one of the wear plates as the drum segments move between their radially outer and inner positions.

(12) The apparatus of any preceding clause, wherein:
each of the fingers is individually pivotally connected to a respective one of the drum segments.

(13) The apparatus of any preceding clause, wherein:
a plurality of return springs operably associated with the plurality of extendible fingers, the return springs biasing the fingers toward their retracted positions.

(14) The apparatus of any preceding clause, wherein:
the carcass release member has a radially outer surface coated with a release material.

(15) The apparatus of any preceding clause, wherein:
the carcass release member extends at least 1.0 inch above an outer drum surface when the drum is in its contracted position.

(16) The apparatus of any preceding clause, wherein:
the drum is configured to build a tire carcass for a truck tire having a rim diameter of at least 22.0 inches.

(17) A method of manufacturing a tire carcass, comprising:
(a) placing an inner layer of a tire carcass about a band drum when the band drum is in a radially expanded position, the band drum including at least one carcass release member retracted into an outer surface of the band drum when the band drum is in its expanded position;
(b) radially contracting the band drum to release the tire carcass from the band drum; and
(c) during step (b), moving the carcass release member outward relative to the outer surface of the band drum to aid in removing the tire carcass from the band drum.

(18) The method of clause 17, further comprising:
prior to step (b), splicing two ends of the inner layer to form a splice overlying the carcass release member.

(19) The method of clause 17 or 18, further comprising:
prior to step (b), compressing the splice against the band drum with a jam pad.

(20) The method of any of clauses 17-19, wherein:
in step (a), the carcass release member is located closer to an axially outboard end of the band drum than to an axially inboard end of the band drum.

(21) The method of any of clauses 17-20, further comprising:
after step (c), radially expanding the band drum to return the band drum to its radially expanded position for receiving another inner layer; and
during the expanding step, biasing the carcass release member back to its retracted position with a return spring.

(22) The method of any of clauses 17-21, wherein:
step (c) further comprises engaging an underside of the carcass release member in sliding engagement with a wear plate mounted on a drum segment adjacent to a drum segment on which the carcass release member is pivotally mounted.

(23) The method of any of clauses 17-22, wherein:
in step (a), the at least one carcass release member comprises a plurality of fingers.

(24) The method of any of clauses 17-23, wherein:
in step (a), each of the fingers is pivotally connected to the band drum; and
in step (c), the fingers pivot outward above the surface of the band drum.

Thus it is seen that the apparatus and methods of the present invention readily achieve the ends and advantages mentioned as well as those inherent therein. While certain preferred embodiments of the invention have been illustrated and described for the present disclosure, numerous changes in the arrangement and construction of parts and steps may be made by those skilled in the art which changes are encompassed within the scope and spirit of the present invention as defined by the appended claims.

What is claimed is:

1. A tire building apparatus, comprising:
a tire building drum having a radially expanded position for building a tire carcass, and having a radially contracted position for releasing the tire carcass, the drum including an inboard end and an outboard end, the outboard end being free to allow removal of the tire carcass axially over the outboard end;
a control system configured to rotate the drum between defined starting and stopping positions during application of an inner layer of a tire carcass to the drum, so that a splice zone is defined by the control system on the drum where ends of the inner layer are to meet to be spliced; and
a carcass release member mounted on the drum and actuated by movement of the drum between its expanded position and its contracted position such that the carcass release member moves from a retracted position when the drum is in its expanded position, to an extended position extending above an outer surface of the drum when the drum is in its contracted position, the carcass release member at least partially underlying the splice zone, so that the carcass release member aids in releasing the tire carcass from the drum when the drum moves from its expanded position to its contracted position, the carcass release member including a row of axially spaced extendible fingers, a plurality of the fingers of the row being located nearer to the outboard end than to the inboard end of the drum.

2. The apparatus of claim 1, further comprising:
a row of jam pads oriented to compress the inner layer against the drum.

3. The apparatus of claim 1, wherein:
the drum includes a plurality of arcuate drum segments movable radially relative to a rotational axis of the drum between radially outer and radially inner positions corresponding to the expanded and contracted positions, respectively, of the drum; and
the fingers of the carcass release member are pivotally attached to at least one of the drum segments and engage an adjacent drum segment so as to be pivoted outward away from the drum outer surface as the drum segments move from their radially outer to their radially inner positions.

4. The apparatus of claim 1, further comprising:
the drum including a plurality of arcuate drum segments movable radially relative to a rotational axis of the drum between radially outer and radially inner positions corresponding to the expanded and contracted positions, respectively, of the drum; and
a plurality of wear plates mounted on the drum segments so that each extendible finger slides against one of the wear plates as the drum segments move between their radially outer and inner positions.

5. The apparatus of claim 1, wherein:
the drum includes a plurality of arcuate drum segments movable radially relative to a rotational axis of the drum between radially outer and radially inner positions corresponding to the expanded and contracted positions, respectively, of the drum; and
each of the fingers is individually pivotably connected to a respective one of the drum segments.

6. The apparatus of claim 1, further comprising:
a plurality of return springs operably associated with the extendible fingers, the return springs biasing the fingers toward their retracted positions.

7. The apparatus of claim 1, wherein:
the carcass release member has a radially outer surface coated with a release material.

8. The apparatus of claim 1, wherein:
the carcass release member extends at least 1.0 inch above an outer drum surface when the drum is in its contracted position.

9. The apparatus of claim 1, wherein:
the drum is configured to build a tire carcass for a truck tire having a rim diameter of at least 22.0 inches.

10. A tire building apparatus comprising:
a tire building drum having a radially expanded position for building a tire carcass, and having a radially contracted position for releasing the tire carcass, the drum including an inboard end and an outboard end, the outboard end being free to allow removal of the tire carcass axially over the outboard end;
a control system configured to rotate the drum between defined starting and stopping positions during application of an inner layer of a tire carcass to the drum, so that a splice zone is defined by the control system on the drum where ends of the inner layer are to meet to be spliced; and
a carcass release member mounted on the drum such that the carcass release member moves from a retracted position when the drum is in its expanded position, to an extended position extending above an outer surface of the drum when the drum is in its contracted position, the carcass release member at least partially underlying the splice zone, so that the carcass release member aids in releasing the tire carcass from the drum when the drum moves from its expanded position to its contracted position, the carcass release member including a row of axially spaced extendible fingers, the row being located nearer to the outboard end than to the inboard end of the drum; and
wherein the row of axially spaced extendible fingers comprises first and second rows of alternating fingers, with the fingers of the first row pointing in a circumferential direction opposite to the fingers of the second row.

11. The apparatus of claim 10, wherein:
the drum includes a plurality of arcuate drum segments movable radially relative to a rotational axis of the drum between radially outer and radially inner positions corresponding to the expanded and contracted positions, respectively, of the drum; and
the fingers of the first row of fingers are pivotally attached to a first one of the drum segments, and the fingers of the second row of fingers are pivotally attached to an adjacent second one of the drum segments.

12. The apparatus of claim 10, wherein:
the fingers of the first row of fingers are of a different length than the fingers of the second row of fingers.

13. A tire building apparatus, comprising:
a tire building drum having a radially expanded position for building a tire carcass, and having a radially contracted position for releasing the tire carcass, the drum including an inboard end and an outboard end, the outboard end being free to allow removal of the tire carcass axially over the outboard end;
a control system configured to rotate the drum between defined starting and stopping positions during application of an inner layer of a tire carcass to the drum, so that a splice zone is defined by the control system on the drum where ends of the inner layer are to meet to be spliced; and
a carcass release member mounted on the drum such that the carcass release member moves from a retracted position when the drum is in its expanded position to an extended position extending above an outer surface of the drum when the drum is in its contracted position, the carcass release member at least partially underlying the splice zone, so that the carcass release member aids in releasing the tire carcass from the drum when the drum moves from its expanded position to its contracted position, the carcass release member including a row of axially spaced extendible fingers, the row being located nearer to the outboard end than to the inboard end of the drum;
wherein the drum includes a plurality of arcuate drum segments movable radially relative to a rotational axis of the drum between radially outer and radially inner positions corresponding to the expanded and contracted positions, respectively, of the drum; and
wherein the drum further includes a plurality of cover plates, each cover plate attached to one of the drum segments and extending generally tangentially to cover a gap between adjacent drum segments when the drum is in its expanded position; and
wherein one of the cover plates has a plurality of windows defined therethrough, and the extendible fingers retract into the windows when the drum is in its expanded position, and the extendible fingers extend out of the windows when the drum is in its contracted position.

14. A tire building apparatus, comprising:
a tire building drum having a radially expanded position for building a tire carcass, and having a radially contracted position for releasing the tire carcass; and
a carcass release member mounted on the drum such that the carcass release member moves from a retracted position when the drum is in its expanded position, to an extended position extending above an outer surface of the drum when the drum is in its contracted position, so that the carcass release member aids in releasing the tire carcass from the drum when the drum moves from its expanded position to its contracted position; and
wherein the drum includes a plurality of arcuate drum segments movable radially relative to a rotational axis of the drum between radially outer and radially inner positions corresponding to the expanded and contracted positions, respectively, of the drum;
wherein the carcass release member is pivotally attached to at least one of the drum segments and engages an adjacent drum segment so as to be pivoted outward away from the drum outer surface as the drum segments move from their radially outer to their radially inner positions; and
wherein the carcass release member includes a plurality of extendible fingers arranged in first and second rows of alternating fingers, with the fingers of the first row pointing in a circumferential direction opposite to the fingers of the second row.

15. The apparatus of claim 14, wherein:
the fingers of the first row of fingers are pivotally attached to a first one of the drum segments, and the fingers of the second row of fingers are pivotally attached to an adjacent second one of the drum segments.

16. The apparatus of claim 14, wherein:
the fingers of the first row of fingers are of a different length than the fingers of the second row of fingers.

17. A tire building apparatus, comprising:
a tire building drum having a radially expanded position for building a tire carcass, and having a radially contracted position for releasing the tire carcass; and
a carcass release member mounted on the drum such that the carcass release member moves from a retracted position when the drum is in its expanded position, to an extended position extending above an outer surface of the drum when the drum is in its contracted position, so that the carcass release member aids in releasing the tire carcass from the drum when the drum moves from its expanded position to its contracted position; and wherein the drum includes a plurality of arcuate drum segments movable radially relative to a rotational axis of the drum between radially outer and radially inner positions corresponding to the expanded and contracted positions, respectively, of the drum;

wherein the carcass release member is pivotally attached to at least one of the drum segments and engages an adjacent drum segment so as to be pivoted outward away from the drum outer surface as the drum segments move from their radially outer to their radially inner positions;

wherein the carcass release member includes a plurality of extendible fingers;

wherein the drum further includes a plurality of cover plates, each cover plate attached to one of the drum segments and extending generally tangentially to cover a gap between adjacent drum segments when the drum is in its expanded position; and one of the cover plates has a plurality of windows defined therethrough, and the extendible fingers retract into the windows when the drum is in its expanded position, and the extendible fingers extend out of the windows when the drum is in its contracted position.

* * * * *